March 15, 1960   M. S. KING   2,928,196
STATION ANNOUNCER
Filed July 26, 1957

INVENTOR.
M. S. KING

United States Patent Office 2,928,196
Patented Mar. 15, 1960

2,928,196
STATION ANNOUNCER
Merrill S. King, Layton, Utah

Application July 26, 1957, Serial No. 674,368

1 Claim. (Cl. 40—86)

This invention relates to transportation equipment and more particularly to a travel guide for passengers.

It is an object of the present invention to provide a travel guide device having indicia for indicating the destination of the vehicle, the route number, and the next stop on the line.

It is another object of the present invention to provide a travel guide of the above type that has mounting means associated therewith for permitting the device to be supported in a clearly visible and accessible location for all passengers and workmen.

Other objects of the invention are to provide a travel guide bearing the above objects in mind which is of simple construction, has a minimum number of parts, is inexpensive to manufacture and efficient in operation.

Figure 1:
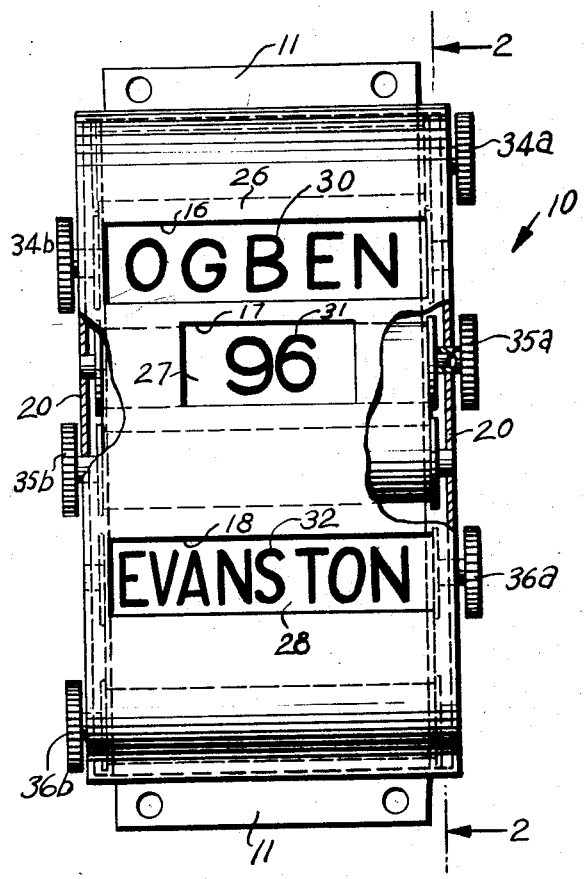
Figure 2:
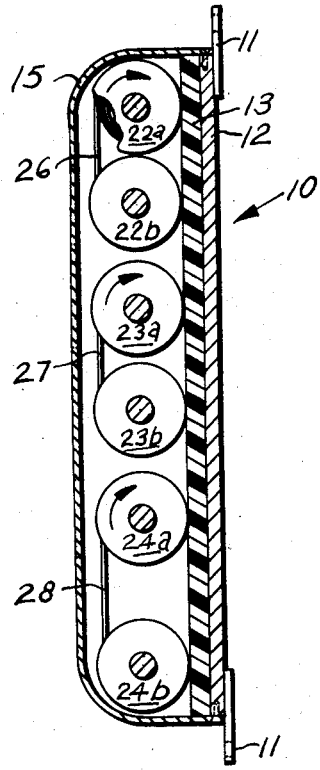

For other objects and for a better understanding of the invention, reference may be had to the following detailed description taken in conjunction with the accompanying drawing, in which:

Figure 1 is a front elevational view, with parts broken away, of a travel guide made in accordance with the present invention; and Figure 2 is a longitudinal cross sectional view taken along line 2—2 of Figure 1.

Referring now more in detail to the drawing, a travel guide device 10 made in accordance with the present invention is shown to include a rigid base wall 12 having mounting brackets 11 supported at the lower and upper ends thereof. A plastic strip 13 is secured to the inside surface of the base wall 12 and is enclosed by a housing 15 in spaced relationship therewith and in frictional contact with each flange of each spool. As is more clearly shown in Figure 1, the face wall of the housing 15 is provided with vertically spaced cutouts 16, 17, 18, for purposes hereinafter described.

The spaced parallel side walls 20 rotatably support vertically spaced pairs of spools 22a, b; 23a, b; 24a, b. Each pair of these spools supports a separate strip 26, 27, 28, respectively, of preferably translucent flexible material such as paper. On the other hand transparent plastic material may be used in place of the translucent material if desired. Indicia 30, 31, 32 is disposed along each strip 26, 27, 28, respectively, to indicate various information. Preferably, the first pair of spools 22a, b is adapted to support a strip 26 having indicia 30 relating to the destination of the particular vehicle, while the second pair of spools 23a, b is provided with a web or strip 27 having indicia 31 relating to the route number of the vehicle, and the other pair of spools 24a, b is provided with a strip 28 bearing indicia 32 relating to the next street stop or town stop of the vehicle. It is to be understood, however, that this indicia may be rearranged, if desired, and that the device may be equally as well supported within a train, as well as a bus, or subway train.

Suitable means is also provided for rotating each pair of spools so as to place the desired indicia in visible location within the provided opening in the face wall of the housing 15. While various types of automatic motor or solenoid means may be used for this purpose, knobs 34a, b; 35a, b; 36a, b are provided for each spool so as to manually control the movement of the strips from one position to the other as may be required. A lamp may be disposed in back of the indicating strips so that the indicia will be visible at night as well as during the day.

It will be recognized that this device will not only expedite the movement of passages from one vehicle to another, but will also provide passages remaining on the vehicle with information at all times. Since many transportation employees cannot announce the names of the various towns in a clear and audible voice, much confusion can be avoided through the use of this simple device. Of course, this device may be made as a double faced structure so that it can be placed in the center of a vehicle and be visible from both ends. If the same car or bus is to make a return trip, the belt or strip on each pair of spools can be given a one-half twist and turn so as to effect the moving of the town names in a backward direction, so that the roll of indicia need not be changed during each return trip. Of course, separate rolls of indicia may be provided for use on each device so that buses and trains going over different routes and having different destinations may use the appropriate strip to render the desired information.

While various changes may be made in the detail construction, it shall be understood that such changes shall be within the spirit and scope of the present invention as defined by the appended claims.

What I claim as new and desire to protect by Letters Patent of the United States is:

In a device of the class described for mounting on a vertical wall, a main housing having a compartment formed therein, said main housing having a vertical rigid flat rear wall having means attached to the upper and lower rear end portions thereof for mounting upon a vertical wall, a dished shaped shell embodying a substantially vertical front wall, said front wall having rearwardly extending side and end walls integrally secured therewith, said end walls secured to the upper and lower ends of said base wall by removable means, a single strip of plastic material permanently secured to and covering the vertical surface of said base wall within said compartment, the end portions of said strip of plastic material abutting with the side and end walls of said dished shape shell, a plurality of pairs of spools rotatably mounted upon the supporting shafts extending between the side walls of said housing and having their respective supporting shafts arranged in a common vertical plane, a web of flexible material wound upon each of said pair of spools and having a portion extending from one spool to the other, indices on each of said webs of flexible material, a rectangular shaped opening in the front wall of said shell adjacent said portion of web material extending between each pair of spools, said spools having flanges in frictional engagement with said single strip of plastic material secured to said rear wall, each of the spool supporting shafts having means on one end thereof for imparting rotation thereto, rotation of one shaft of a pair of shafts with spools thereon in a desired direction will effect rotation of the other shaft and spool thereon of said pair in the same direction due to the connecting web wound thereon, and the frictional engagement of said flanges upon the vertical surface of said single strip of plastic material will retard the rotation of said other spool to maintain the web taut.

References Cited in the file of this patent
UNITED STATES PATENTS

| Number | Name | Date |
|---|---|---|
| 325,005 | Monteiro | Aug. 25, 1885 |
| 357,542 | Travis | Feb. 8, 1887 |
| 365,184 | Jones | June 21, 1887 |
| 1,620,077 | Cooke | Mar. 8, 1927 |
| 2,063,126 | Schelly | Dec. 8, 1936 |
| 2,766,540 | Brown et al. | Oct. 16, 1956 |